May 28, 1929.  W. A. JONES  1,715,068
DRUM CONNECTION JOINT
Filed Jan. 23, 1922  3 Sheets-Sheet 1
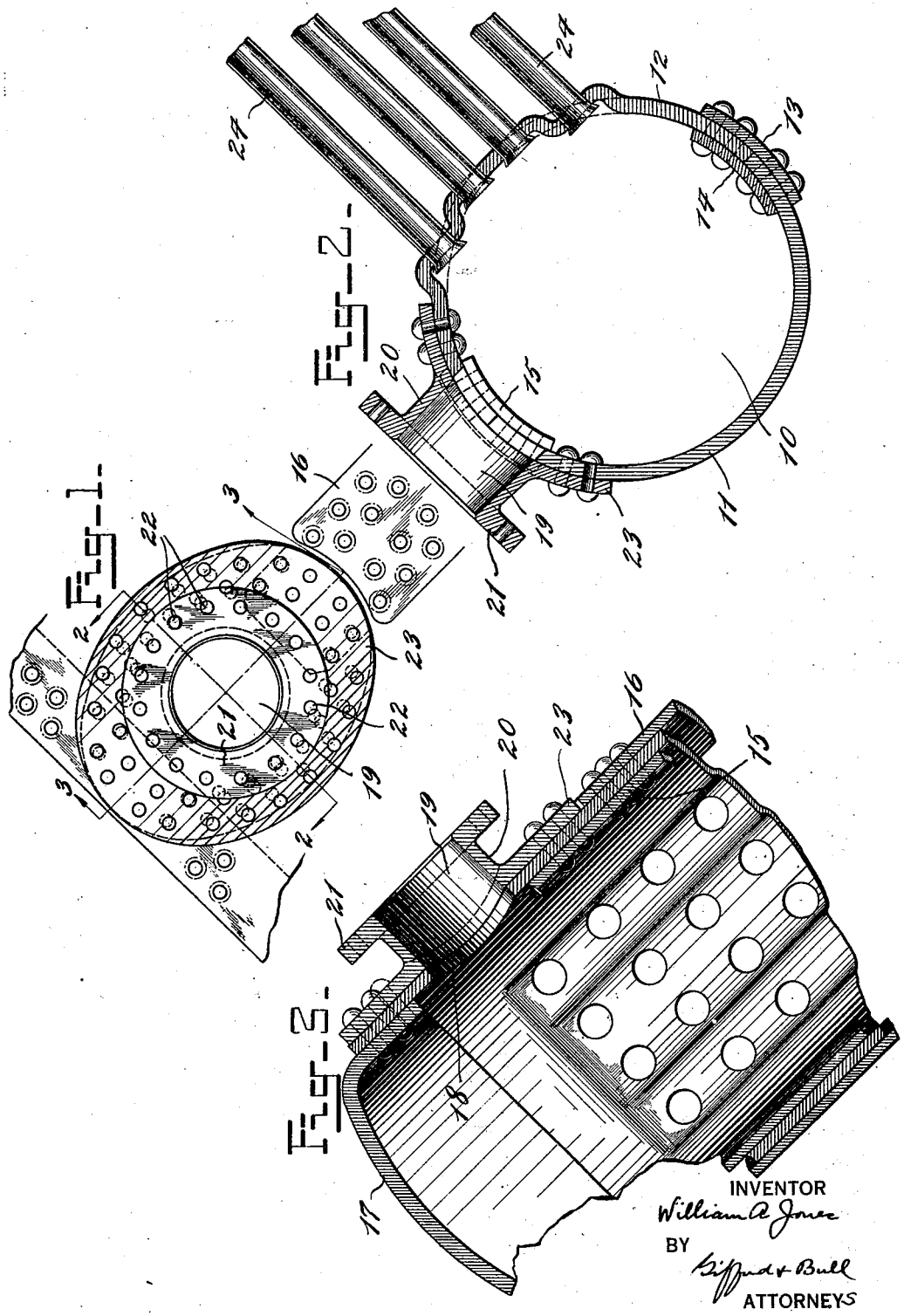
INVENTOR
William A. Jones
BY
Gifford & Bull
ATTORNEYS

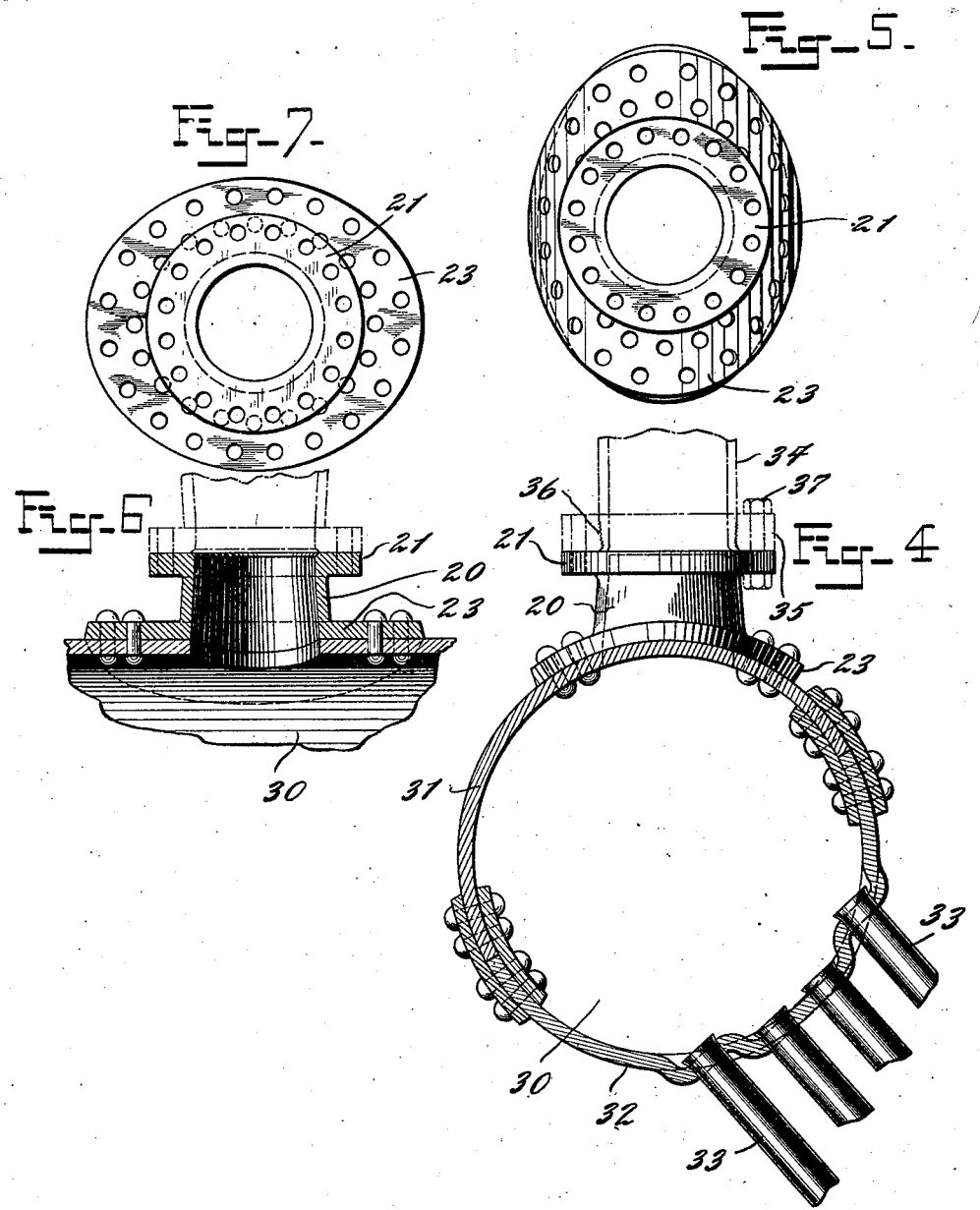

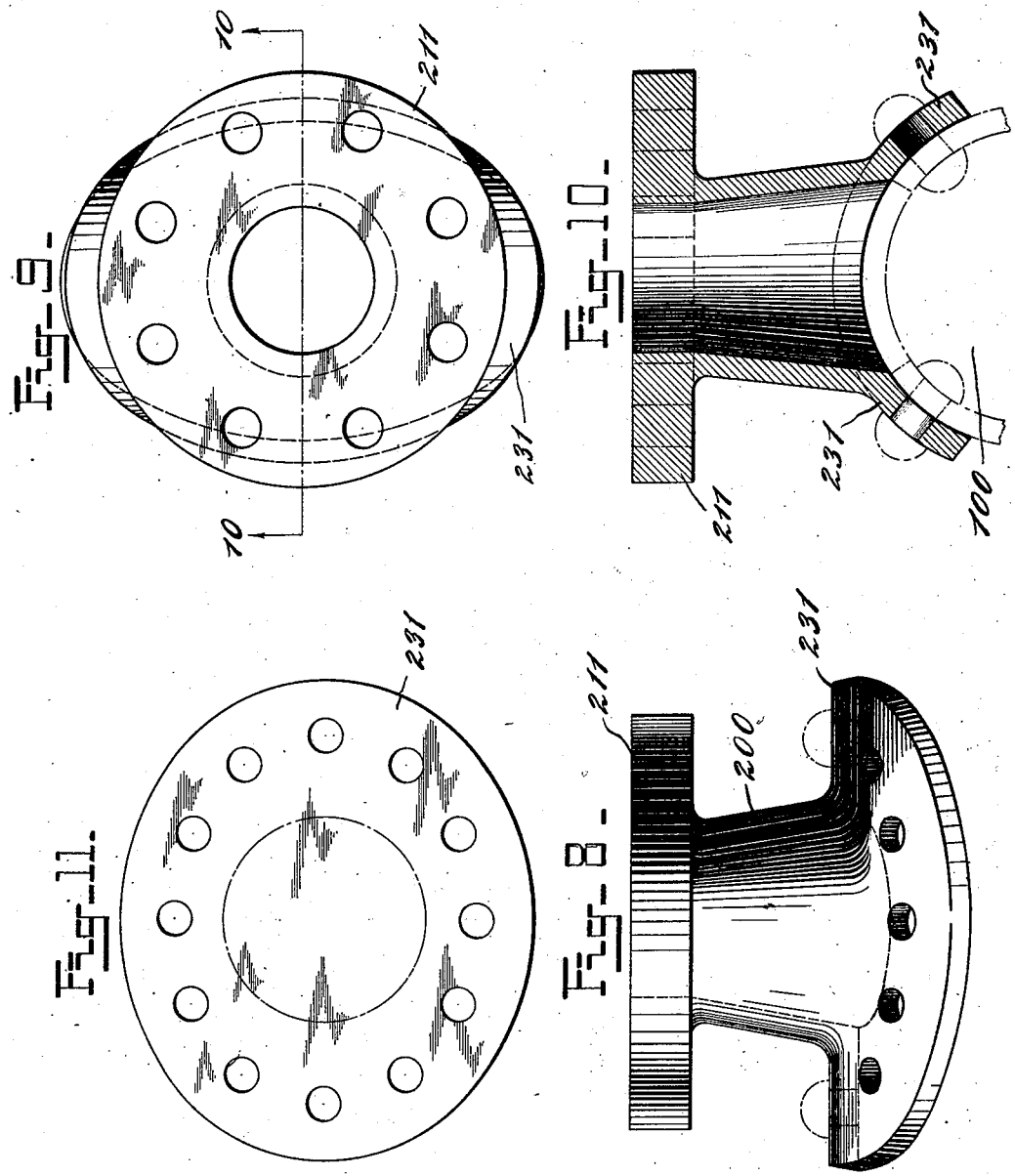

Patented May 28, 1929.

1,715,068

UNITED STATES PATENT OFFICE.

WILLIAM A. JONES, OF WEST NEW BRIGHTON, NEW YORK, ASSIGNOR TO THE BABCOCK & WILCOX COMPANY, OF BAYONNE, NEW JERSEY, A CORPORATION OF NEW JERSEY.

DRUM-CONNECTION JOINT.

Application filed January 23, 1922. Serial No. 531,017.

My present invention relates to connections by which pipes may be connected to drums.

One of the objects of my invention is to provide such a connection in which a reduced amount of surface of the connection will be exposed to the fluid or gas pressure carried by the drum and, at the same time, sufficient space will be provided for the insertion of the necessary fasteners between the joint and the drum. Another object of my invention is to provide a joint which may be applied to a drum in which the opening leading to the drum is located in the seam between the edges of the metal forming the drum, the joint being formed so that it constitutes not only means for connecting the pipe to the drum, but also as a staying member for the seam of the drum itself.

With these and other objects in view, my invention consists in the arrangements and constructions hereinafter described and more specifically pointed out in the appended claim.

In the drawings, Figure 1 is a plan, Fig. 2 a section on the line 2—2 of Fig. 1, and Fig. 3 a section on the line 3—3 of Fig. 1, of one form of my invention, showing a flanged pipe joint located at the seam of a drum; Fig. 4 is a side view, partly in section, of another embodiment of my invention showing a joint applied to a part of a drum not including the seam; Fig. 5 is a plan view of Fig. 4; Fig. 6 is a partial vertical longitudinal section of the drum and joint shown in Fig. 4; Fig. 7 is a plan view of Fig. 6; Fig. 8 is a side elevation of another modification showing a joint with a single row of bolt holes to fasten the flange of the joint to the drum; Fig. 9 is a plan of Fig. 8; Fig. 10 is a section on the line 10—10 of Fig. 9, and Fig. 11 is a bottom view of Fig. 8 showing the bottom flange before it is bent to fit the drum.

Like reference characters refer to like parts in the several views.

When pipes are to be connected to drums in which fluids or gases are carried under pressure, nozzle or joint pieces are connected to the drum and the pipe connected to this nozzle or piece. In many cases, the end of the nozzle to which the pipe is connected is provided with a circular flange to which the pipe is connected, either by bolts or other fastening means. Similarly, the part of the nozzle which is curved to fit the drum is fastened to the drum by one or more rows of rivets. Because of the extension of the upper flange, the rivets cannot be inserted and headed by the usual riveting tools unless the rivet holes are outside the upper flange. It has been the practice heretofore, therefore, to make the lower flange circular and of such a size that the rivet holes are outside the projected area of the upper flange. After the rivets are driven, the edges of the flange against the drum are caulked with a caulking tool which sets the edge of the flange against the drum shell to make a tight joint. The area of the flange against the drum is therefore subject to the pressure of the fluid in the drum, and the force which must be resisted by the rivets is the product of the fluid pressure per square inch and the projected area of the flange in contact with the drum sheet. The smaller this projected area, therefore, the greater the pressure per square inch the rivets in any given nozzle will be able to resist. By my present invention, I reduce this projected area to a minimum without increasing the difficulty of inserting and heading the rivets. Furthermore, in connecting nozzles to drums, it also sometimes happens that, by reason of other parts connected to or inserted in the drum sheet, relatively small space remains for the nozzle flange adjacent the drum sheet. By my invention, I also am enabled to decrease the area occupied by this nozzle flange without decreasing the space required for the necessary number of rivets to resist the pressure. In the several modifications illustrated, a construction is shown which accomplishes both of these results.

Drums are sometimes formed of one or more sheets bent to the proper curves with their edges meeting at a butt joint, this joint being held by a stay strip extending along the joint and riveted to the sheet at either side of the joint. In certain constructions, it is desirable to form the opening for a nozzle in this joint. By the arrangement illustrated in Figs. 1, 2 and 3, I have provided a construction by which this may be accomplished without weakening the joint.

In general, I accomplish all of the purposes indicated above, by making the flange which is in contact with the drum, elliptical, with the long axis of the ellipse equal to the diameter of the circular flange heretofore used in such constructions, and the short axis just large enough so that, while the rivet holes near that axis are within the projected area of the upper flange, nevertheless, because of the bending down of that part of the flange to fit the curvature of the drum, the rivets may be entered and headed without interfering with the upper flange.

In the arrangement shown in Figs. 1, 2 and 3, a drum 10 is shown rolled up from two segments 11 and 12, with butt joints provided with stay strips 13 and 14 at opposite sides, secured by rivets in the usual manner. Similarly, the butt joint at the opposite side of the drum is provided with an inner stay strip 15 and an outer stay strip 16, also secured by rivets on either side of the butt joint. The drum has a head 17 inserted therein and secured by the usual rows of rivets.

In the arrangement shown in these figures, a large pipe opening 18 is formed in the wall of the drum with the line of a butt joint at one side passing through the center of the opening 18. In alignment with this opening 18 is the hole or opening 19 of the pipe joint 20 provided with an outer flange 21 which may be circular in form and provided with a row of holes 22, 22 by which the flange of a pipe connection may be fastened to the flange 21. Such a connection is illustrated in dotted lines in Figs. 4 and 6.

At the end opposite the flange 21, the joint 20 has a flange 23 which is elliptical in form and curved to fit the surface of the drum 10. The long axis of the ellipse extends parallel with the axis of the drum 10. The flange 23 may be provided with one or more rows of fastener openings, the arrangement shown in Figs. 1, 2 and 3 having a double row of rivet holes parallel to the edge of the flange 23.

These rivet holes will be substantially normal to the inner surface of the flange 23 and therefore radial to the drum 10. By reason of the extension of the flange 21, the rivet holes in the flange 23 must be arranged so that the rivets may be entered, and by making the flange 23 elliptical, I am enabled to accomplish this and, at the same time, reduce the projected area of the flange so that a greater pressure per square inch may be resisted by the rivets. As will be seen from an inspection of Fig. 1, the portion of the flange 23 which most nearly approaches parallelism with the flange 21 is on the long axis of the ellipse, so that the rivet holes in this portion of the flange are outside of the projected area of the flange 21. On the other hand, on the short axis of the flange 23, some of the rivet holes will be within the projected area of the flange 21, and yet the rivets may be entered therein and headed, because this portion of the flange is bent down sufficiently for that purpose, as shown best in Fig. 2.

The upper stay strip 16 is terminated adjacent the edge of the flange 23, and the flange 23 acts as a stay strip for the portion of the seam around the opening 18.

In the form shown in Fig. 2, tubes 24 are expanded into the drum 10 at one side thereof and the elliptical shape of the flange 23 admits the insertion of such tubes nearer to the opening 18 than would otherwise be possible.

In the form shown in Fig. 4, the joint piece 20 is shown and applied to a drum 30, formed of two pieces 31 and 32 and having tubes 33 expanded into one side thereof, the two pieces of the drum being joined with butt seams and having the usual stay pieces. The joint is connected to a part of the drum not over either of the butt seams, and the elliptical shape of the flange 23 in this application of my invention permits the use of a wider stay piece over the butt seams than would be otherwise possible, and also decreases the area subject to the pressure of the fluid in the drum.

In Fig. 4, I have shown in dotted lines a pipe 34 having a flange 35 connected thereto as by fine threads 36, with bolts 37 passing through holes in the flange 35 and the flange 21. The flange 35 may be integral with the pipe 34, as in Fig. 6.

In Figs. 8 to 11, I have shown a modification in which a single row of rivet holes around the flange 231 of the joint member 200 is shown. In this case, the joint is shown applied to a relatively small drum 100 and the neck of the member 200 between the flange 231 and the flange 211 is sufficiently long so that, while all of the rivet holes in the flange 231 are beneath the projected area of the flange 211, the curvature of the flange 231 and the length of this neck permits the ready insertion of the fasteners. The flange 231 may be formed as an ellipse, as shown in Fig. 11, and the rivet holes punched therein before bending to the shapes shown in Figs. 8 and 10.

While I have shown a preferred form of my invention, it will be understood that the construction may be varied within wide limits. For instance, for some purposes, instead of using the flange 21 and the bolts passing therethrough to attach the pipe, the pipe may be threaded directly into the opening 19. It will also be understood that, while preferably I make the flanges which are connected to the drum, elliptical in outline, this precise shape need not be adhered to, since, for some purposes, a flange of other shapes may be used, particularly one which is longer than it is wide.

I claim:—

A drum formed of sheet metal and having a butt joint extending parallel to the axis of the drum and an opening through the butt joint adjacent the end thereof, a combined pipe connection and stay strip for said butt joint, comprising a hollow cylindrical member with its opening over the opening in the drum and having a flange fitting the surface of the drum and connected by rivets to the sheet metal of the drum at each side of the butt joint, an outer stay strip on the outside of the drum over the portion of the butt joint not covered by said flange, an inner stay strip on the inside of the drum with one end thereof extending beneath said flange to a point adjacent said opening, said inner and outer stay strips being connected by rivets extending through the sheet metal of the drum at each side of the butt joint and the end of said inner stay strip and said flange being connected by rivets extending through the sheet metal of the drum at each side of the butt joint, and a head for said drum having its flanges inside the drum and extending beneath the flange of said cylindrical member, the flange of the drum head and the flange of said cylindrical member being connected by rivets extending through the sheet metal of the drum at each side of the butt joint.

WILLIAM A. JONES.